United States Patent
Arenburg et al.

(10) Patent No.: US 7,739,340 B2
(45) Date of Patent: Jun. 15, 2010

(54) METHOD, SYSTEM AND COMPUTER PROGRAM PRODUCT FOR ENABLING ELECTRONIC CHAT WITH ONLINE CALENDAR INVITEES

(75) Inventors: Robert Thomas Arenburg, Round Rock, TX (US); Franck Barillaud, Austin, TX (US); Bradford Lee Cobb, Cedar Park, TX (US); Shivanth Dutta, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 11/533,377

(22) Filed: Sep. 20, 2006

(65) Prior Publication Data

US 2008/0071868 A1 Mar. 20, 2008

(51) Int. Cl.
*G06F 15/16* (2006.01)
(52) U.S. Cl. .............. 709/206; 715/751; 379/260; 379/202.01; 379/201.01
(58) Field of Classification Search ......... 709/206–207; 715/751
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,430,604 B1 * | 8/2002 | Ogle et al. | 709/207 |
| 6,539,421 B1 * | 3/2003 | Appelman et al. | 709/206 |
| 6,675,356 B1 * | 1/2004 | Adler et al. | 715/200 |
| 6,807,562 B1 | 10/2004 | Pennock | |
| 6,912,564 B1 * | 6/2005 | Appelman et al. | 709/204 |
| 7,085,258 B2 * | 8/2006 | Creamer et al. | 370/352 |
| 7,185,059 B2 * | 2/2007 | Daniell et al. | 709/206 |
| 7,360,164 B2 * | 4/2008 | Bjoernsen et al. | 715/751 |
| 7,526,472 B2 * | 4/2009 | Heidloff et al. | 707/3 |
| 2003/0023691 A1 * | 1/2003 | Knauerhase | 709/206 |
| 2003/0037112 A1 | 2/2003 | Fitzpatrick | |
| 2003/0233416 A1 * | 12/2003 | Beyda | 709/206 |
| 2004/0054646 A1 * | 3/2004 | Daniell et al. | 707/1 |
| 2004/0054737 A1 * | 3/2004 | Daniell | 709/206 |
| 2004/0064514 A1 * | 4/2004 | Daniell et al. | 709/206 |
| 2004/0078444 A1 | 4/2004 | Malik | |

(Continued)

OTHER PUBLICATIONS

Belfore et al., VRML Clients Linked Through Concurrent Chat, Proceedings of the 2002 Winter Simulation Conference, pp. 518-524.

(Continued)

*Primary Examiner*—John Follansbee
*Assistant Examiner*—Saket K Daftuar
(74) *Attorney, Agent, or Firm*—Dillon & Yudell LLP

(57) ABSTRACT

A Meeting Attendee Instant Messaging (MAIM) utility is provided and embeds Instant Messaging (IM) functionality in a calendaring software. When a meeting request is sent out from the calendaring application, the request receives invitee responses, which automatically populates a Meeting Invitee Status Display (MISD). The MISD graphically illustrates which invitees have accepted the request to the meeting (i.e., attendees), and also provides an indication of a current IM status of each attendee to the meeting. The meeting facilitator may optionally select specific attendees or all attendees and initiate a one-to-one or group IM chat session with the selected attendees to begin a chat. The group IM session chat is initiated from within the MISD without providing the meeting facilitator with anything other than the e-mail addresses or e-mail IDs of the attendees.

17 Claims, 10 Drawing Sheets

U.S. PATENT DOCUMENTS

| | | |
|---|---|---|
| 2004/0078446 A1* | 4/2004 | Daniell et al. ............... 709/206 |
| 2004/0078448 A1* | 4/2004 | Malik et al. ................. 709/206 |
| 2004/0145608 A1 | 7/2004 | Fay |
| 2004/0167987 A1 | 8/2004 | Reese |
| 2004/0186896 A1* | 9/2004 | Daniell et al. ............... 709/207 |
| 2005/0030937 A1* | 2/2005 | Wick et al. .................. 370/352 |
| 2005/0108341 A1* | 5/2005 | Mathew et al. ............. 709/206 |
| 2005/0125737 A1 | 6/2005 | Allen |
| 2005/0223075 A1 | 10/2005 | Swearingen |
| 2006/0047748 A1 | 3/2006 | Kelso |
| 2006/0129643 A1* | 6/2006 | Nielson et al. ............. 709/206 |
| 2006/0168315 A1* | 7/2006 | Daniell et al. ............... 709/237 |
| 2006/0190546 A1* | 8/2006 | Daniell ....................... 709/206 |
| 2006/0190547 A1* | 8/2006 | Bhogal et al. ............... 709/207 |
| 2007/0036318 A1* | 2/2007 | Gits et al. .............. 379/202.01 |
| 2007/0143426 A1* | 6/2007 | Jaquinta ..................... 709/206 |
| 2007/0168447 A1* | 7/2007 | Chen et al. .................. 709/207 |
| 2008/0065758 A1* | 3/2008 | Narayanaswami .......... 709/224 |

OTHER PUBLICATIONS

Ma, et al., A Chat System Based on Emotion Estimation from Text and Embodied Conversational Messengers, IEEE, 2005, pp. 546-548.

* cited by examiner

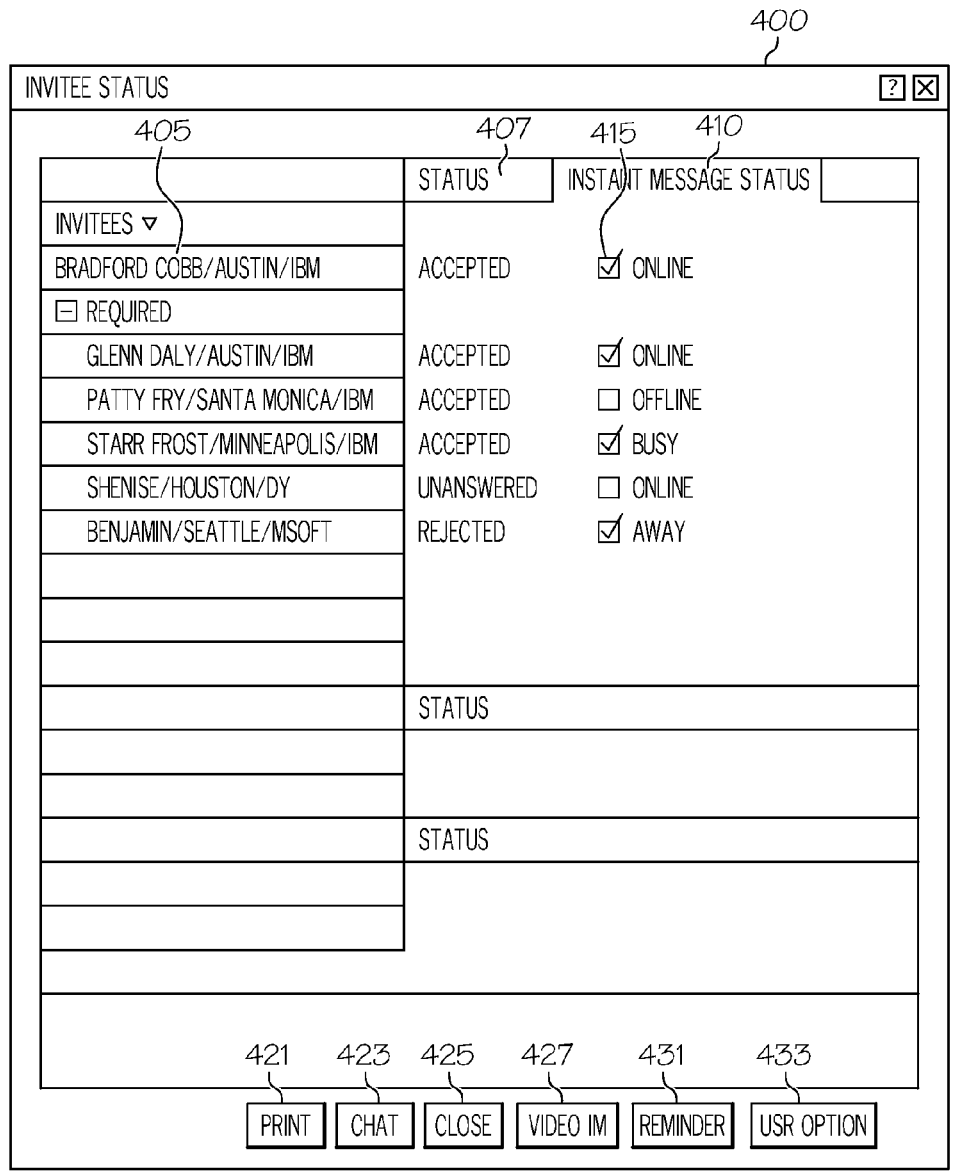

The owner of the meeting sees the current sametime status for all attendees and can optionally select which attendees or all attendees to begin a chat. The benefit is no new groups are created or further manacd, the owher doen't have to kno the attendees current sametirne/instant messaging id, enables outside attendees to participate using other instant messaging vehicles. Possibility of adding video or other collaborative techniques at the push of a button.

FIG. 4

METHOD, SYSTEM AND COMPUTER PROGRAM PRODUCT FOR ENABLING ELECTRONIC CHAT WITH ONLINE CALENDAR INVITEES

BACKGROUND OF THE INVENTION

1. Technical Field

The present invention generally relates to computer systems and devices, and in particular to software application processes on computer systems and devices. Still more particularly, the present invention relates to a method and system for enhancing meeting calendar/scheduling software application processes on computer systems and devices.

2. Description of the Related Art

A growing number of computer users rely on the meeting scheduling/calendaring functions that are provided by conventional electronic calendaring and/or e-mail applications. One of the functions provided by these applications is the scheduling of meetings (e.g., conference calls) with one or more individuals (invitees) and issuing the invitations for such meetings to the invitees' electronic devices or electronic mailboxes, etc. Often, the meeting is conducted via telephone (e.g., a telephone conference), and the calendaring function simply enables the person calling the conference (hereinafter referred to interchangeably as "meeting owner" or "facilitator") to inform the invitees of the meeting's topic, date, and time. Also, the use of the calendaring function enables the invitees to provide an electronic response (RSVP) to the invitation/request.

The invitees are typically identified by an e-mail or other electronic address (e.g., IP address or computer machine (MAC) address) and provide an electronic response from that address. The invitees typically provide a response (RSVP) message indicating the invitee's intention or ability to attend or not attend the meeting/conference. Certain calendaring/scheduling software may prompt the invitee to respond with an acceptance or rejection and then automatically return the response to the meeting facilitator.

In a somewhat analogous art, a large number of computer users have some sort of instant messaging (IM) application on their computer system and/or other portable electronic device, such as a cell phone or personal digital assistant (PDA). Certain applications, e.g., Lotus Notes® and MSN Hotmail®, provide some association between the e-mail software and associated IM software. This association enables cross-features, such as: (a) a user of the IM software selecting one of the IM identities (or addresses) and automatically opening the e-mail engine to send an e-mail to the e-mail address corresponding to the IM identity (ID) and/or (b) the e-mail inbox displaying an icon indicating whether or not the user is currently logged into his computer (or his IM service), or some other current IM status of the user. However, current IM applications are independent of the calendaring function whether or not provided within or associated with the e-mail engine.

Utilizing the calendaring function, the facilitator of a meeting (interchangeably referred to as a conference call, which represents one type of meeting that may be scheduled) will electronically invite people to a conference call, and may then follow up with a reminder message, delivered via e-mail or via phone. However, even with such reminder methods prior to the time at which the meeting is scheduled to begin, it is not uncommon for the facilitator of the meeting/conference call to be made to wait for invitees to join the call. Frequently, the facilitator has to call those invitees after the meeting/conference call is scheduled to begin to remind the attendee to call in to the conferencing center. When the meeting attendee is online, an astute facilitator may be able to send a reminder by opening his/her IM client and sending the attendee an IM message reminding the attendee that the meeting is about to begin. This process requires that the attendee be "online," and the facilitator has to open his IM portal, recognize that the attendee's IM status is "online", and then open the chat session with that one attendee.

With the current IM systems, the facilitator may individually establish an IM session with each attendee who has not yet joined the meeting and prompt/remind that person that the call has in fact begun. Thus, the facilitator has no way of knowing if the person is online unless that facilitator opens his/her IM client and has that attendee's IM ID added to the list of contacts in the IM client. To provide this reminder to multiple attendees requires that each attendee have an online presence and his/her IM ID included within the list of contacts in the facilitator's IM client. More likely than not, the persons (invitees) with whom these meetings are scheduled are not the same people that are "close" enough to be included in the facilitator's list of IM contacts. Thus, while the facilitator may be able to ping one or more of the attendees via the IM portal, many others attendees may not be reachable without some other means of contacting the person outside of the telephone conference itself or e-mail addresses. Additionally, in other situations, the facilitator may also wish to start an IM session with all attendees to a meeting to share a URL or some other bit of information electronically. Without having an IM group established, this process becomes cumbersome and discourages use of the IM chat to share such information.

Today, the facilitator could individually invite each "accepted" invitee to a chat to see where the person is and remind the person of the conference call/meeting. In the Lotus Notes® environment, the facilitator may also/possibly use NotesBuddy® to create a group chat. However, this would require knowledge of each attendee's note signing ID and/or manual creation of a specific contact group of the note signing IDs for that specific meeting. However, since each meeting may involve different numbers and different sets of participants, manual creation of a group for each meeting schedule is time-consuming and inefficient.

SUMMARY OF THE INVENTION

Disclosed is a method, system and computer program product for enhancing a computer-implemented meeting scheduling/calendaring function with instant messaging capability, whereby each attendee to the meeting (or conference call) may be quickly joined in a single chat session by the meeting facilitator. A Meeting Attendee Instant Messaging (MAIM) utility is provided and embeds Instant Messaging (IM) functionality in a calendaring software. When a meeting request is sent out from the calendaring application, the request receives invitee responses, which automatically populate a Meeting Invitee Status Display (MISD). The MISD graphically illustrates which invitees have accepted the request to the meeting (i.e., attendees), and also provides an indication of a current IM online status of each attendee to the meeting.

Thus, the MAIM utility extends the MISD with an output next to each attendee name/identifier of the current IM status of the attendee. This display enables the meeting facilitator to see the current online IM status for all attendees when MISD is opened. The meeting facilitator may optionally select specific attendees or all attendees and initiate a one-to-one or group IM chat session with the selected attendees to begin a chat. The group IM session chat is initiated from within the MISD without providing the meeting facilitator with anything other than the e-mail address/name of the attendee. That is, the facilitator does not have to know the attendees' actual IM IDs. Further, no generation of a new IM group is required before initiating the group IM session chat, and thus no new IM group has to be managed (members added and removed) by the facilitator. Finally, use of the features of the MAIM utility enables outside attendees to participate using other types of IM clients. In one embodiment, outside attendees provide their IM ID within the response message transmitted from the outside attendee to the facilitator's computer. In another embodiment, the functions of the MAIM utility are further extended to enable the addition of video or other collaborative techniques by selection of a displayed, selectable icon/button on the MISD.

In one embodiment, all invitees are displayed with their current online IM status indicated, enabling the facilitator to selectively join other invitees to a group chat, where those invitees may have initially indicated that they would not attend the meeting/phone conference, but are available for a less intrusive online chat. The calendaring application may be further enhanced to provide the invitees the option of selecting the "chat available" response. The calendaring software may be a standalone software or may be associated with an e-mail engine, such as Lotus Notes® or Microsoft Outlook®. The IM engine may be Sametime (associated with Lotus Notes®) or Windows Live Messenger® (associated with MSN and the Hotmail® family of e-mail engines), or any other publicly or commercially available IM software.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is an example graphical user interface (GUI) of a Meeting Invitee Status Display (MISD), enhanced with invitees' online IM status, in accordance with one embodiment of the invention;

DETAILED DESCRIPTION OF AN
ILLUSTRATIVE EMBODIMENT

The present invention provides a method, system and computer program product for enhancing a computer-implemented meeting scheduling/calendaring function with instant messaging capability, whereby each attendee to the meeting (or conference call) may be quickly joined in a single chat session by the meeting facilitator. A Meeting Attendee Instant Messaging (MAIM) utility is provided and embeds Instant Messaging (IM) functionality in a calendaring software. When a meeting request is sent out from the calendaring application, the request receives invitee responses, which automatically populate a Meeting Invitee Status Display (MISD). The MISD graphically illustrates which invitees (via e-mail account identifier (ID) or other invitee name) have accepted the request to the meeting (i.e., attendees), and also provides an indication of a current online status of the IM ID of each attendee to the meeting.

The invention is specifically described from the perspective of a human facilitator providing an electronic notice of a meeting to human attendees. However, as is later described, the various process steps of the invention are capable of being completed via a computer without actual human interaction.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Figure 1:
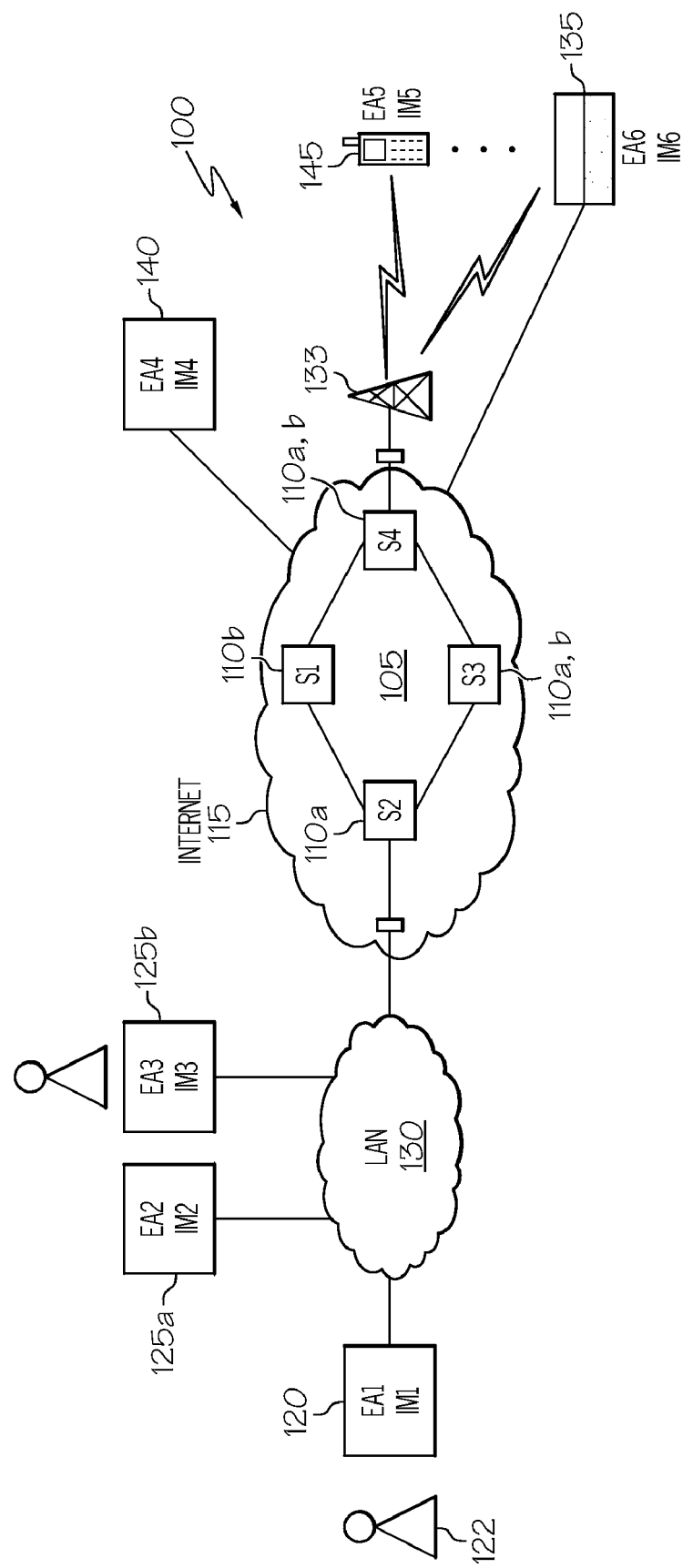
FIG. 1 illustrates an example communication network within which electronic communication, including instant messaging (IM) and calendaring e-mail messages are communicated in accordance with one embodiment of the invention.

With reference now to the figures, FIG. 1 is a network diagram showing an embodiment of an extended communication network comprising a local area network (LAN) connected to a wide area network (such as the Internet), according to the described embodiments of the invention. The invention provides functional enhancements to electronic calendaring functions, which generate electronic mail (e-mail) transmission of requests to multiple recipients, and thus the communication network provided is shown and described from the perspective of the originator of an electronically transmitted meeting notice (hereinafter referred to interchangeably as "meeting owner" or "facilitator").

Communication network 100 comprises a network infrastructure/backbone 105 within which various service providers and/or content servers (servers) 110 are connected. Among these servers 110 are e-mail servers 110a and instant messaging (IM) servers 110b, which, in some instances, may be the same physical server device. E-mail servers 110a enable communication of e-mails from an originator e-mail address to a recipient e-mail address via respective e-mail engines (e-mail client software). Likewise, IM servers 110b enable transfer of instant messages from an originator IM identity (ID) to a recipient IM ID. E-mail servers 110a and IM servers 110b respectively include e-mail server applications and IM server applications. The individual user devices (described below) also include e-mail engines and IM clients to enable the users of the devices to e-mail and "chat" with each other by exchanging communications between respective devices over communication network 100.

Communication network 100 further comprises a plurality of connected user devices that originate and receive the electronic communications that occur through servers 110.

Among these user devices are facilitator's computer system 120 and local attendee (or invitee) devices 125*a-b* and remote attendee/invitee devices (135, 140, 145). Local invitee devices 125*a-b* are connected to facilitator device 120 via a local area network (LAN) 130, which is in turn coupled to Internet 115. As shown in FIG. 1, remote invitee devices are communicatively coupled to Internet 115. Among the illustrated remote invitee devices are workstation 140, cellular telephone 145, and personal digital assistant (PDA) 135. Notably, as shown, each device has a corresponding e-mail address (EAn) and IM identifier (ID) associated therewith. The EAn and IM IDs are provided solely for illustration, and it is understood that these parameters refer to both a human user (facilitator and/or invitee/attendee) as well as the actual electronic software components that may be owned by and identify specific human users.

The combination of user devices illustrated all support receipt and transmission of e-mails and IMs via respective e-mail and IM software capabilities (e.g., e-mail engine and IM client) provided within each device. Depending on the remote invitee device (135, 140, 145), both wired and wireless communication may be utilized to connect to Internet 115, with wireless communication being provided via an intermediary wireless/cellular antenna 133. While specific types of electronic devices are shown and described, the features of the invention are applicable to any other electronic device that is configured to engage in e-mail and IM communications (via a network or direct connection).

It should be appreciated that, while an example embodiment shows the Internet as the transmission medium, other embodiments may be implemented in other networked environments. Several different devices are illustrated by FIG. 1 to illustrate the applicability of the invention across various device types. Further hardware and software details of an exemplary computer system that represents facilitator's computer system 120 are provided in the description of FIG. 2.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only, and not meant to imply any limitations on the invention. The invention may thus be implemented with different nomenclature/terminology utilized to describe the above parameters, without limitation.

Figure 2A:
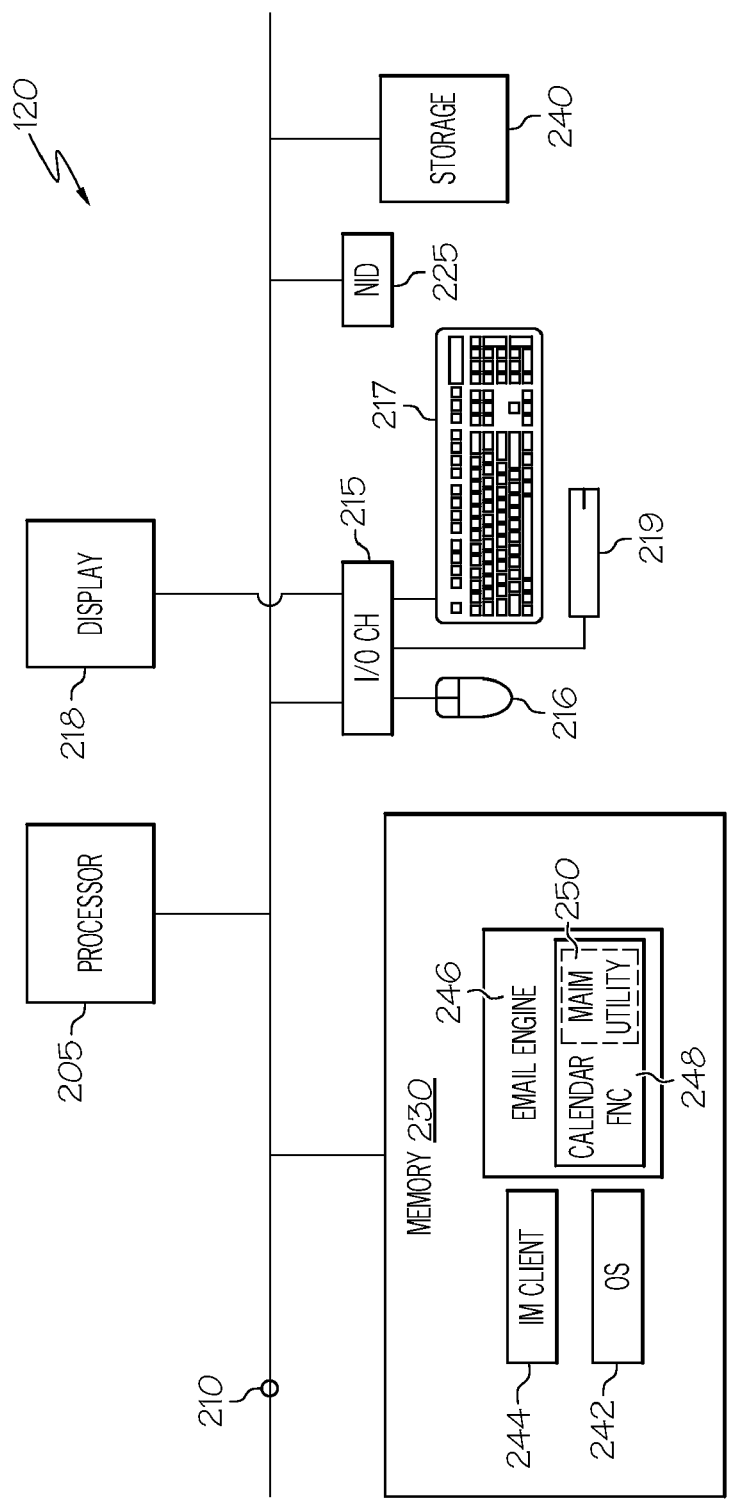
FIG. 2A illustrates an example data processing system configured with a Meeting Attendee IM (MAIM) utility to enable the various features provided within embodiments of the present invention.

FIG. 2A is a block diagram illustrating an example computer system, which may be utilized as a computer system of the meeting facilitator. While the facilitator's device is described herein as a computer system, those of skill in the art appreciate that any other type of electronic device capable of completing the calendaring and IM and e-mail functions described herein may be utilized by the facilitator to set up the meeting and perform the other functions described.

Computer system 120 comprises a processor 205 coupled to a memory 230 via a system bus/interconnect 210. Also coupled to system bus 210 is an input/output controller (I/O Controller) 215, which controls access by several input devices, of which mouse 216 and keyboard 217 are illustrated. I/O Controller 215 also controls access to output devices, of which display 218 is illustrated.

Computer system 120 may also include local storage device 240, which may be a hard drive configured to electronically store data and/or computer programs that execute on the computer system. Processor 205 is configured to access programs that are stored on the local storage device 240 and execute the program with the assistance of the memory 230, as further described below. Also, in order to support use of removable storage media, I/O Controller 215 may further support one or more USB ports (not specifically shown) and a removable medium drive 219, such as a floppy drive and/or compact disk Read/Write (CDRW) drive and/or digital video disk (DVD) drive.

Computer system 120 further comprises network interface device (NID) 225 by which computer system 120 is able to connect to and communicate with an external device or network (such as LAN 130 or Internet 115). Thus, NID 225 provides the interface for the computer system 120 to receive any data that may be entering from Internet 115 and, also, to transmit any data from the recipient workstation 110 to Internet 115. NID 225 may be a modem or network adapter and may also be a wireless transceiver device or any other interface device by which communication to an external network is enabled.

Those of ordinary skill in the art will appreciate that the hardware depicted in FIG. 2A may vary. For example, other peripheral devices, such as optical disk drives and the like, also may be used in addition to or in place of the hardware depicted. Thus, the depicted example is not meant to imply architectural limitations with respect to the present invention. The computer system depicted in FIG. 2A may be, for example, an IBM eServer pSeries system, a product of International Business Machines Corporation in Armonk, N.Y., running the Advanced Interactive Executive (AIX) operating system or LINUX operating system.

Various features of the invention are provided as software applications or code stored within memory 230 or other storage 240 and executed by processor 205. Among the software code are code for providing operating system (OS) functionality, code for providing the IM functionality, and code for enabling network connection and communication via NID 225. More specific to the invention, the software code includes code for enabling enhanced e-mail calendaring functionality, which provides for the association/linking of the IM functionality to that of e-mail calendaring. For simplicity, the collective body of code that enables the enhanced e-mail calendaring functionality/features is referred to herein as Meeting Attendee IM (MAIM) utility. In actual implementation, the MAIM utility may be added to existing code of e-mail engine software and/or calendaring software to provide the various functional features described below.

Thus, as shown by FIG. 2A, in addition to the above described hardware components, computer system 120 further comprises software components including operating system (OS) 242 (e.g., Microsoft Windows®, a trademark of Microsoft Corp., or GNU®/Linux®, registered trademarks of the Free Software Foundation and The Linux Mark Institute), IM client 244 and e-mail engine 246. E-mail engine 246 further includes calendaring function 248 and associated MAIM utility 250. Of course, in alternate embodiments, calendaring function 248 may be a separate application from e-mail engine 246. In such embodiments, calendaring function 248 utilizes e-mail engine 246 solely to enable (a) electronic transmission of meeting notices to invitees' e-mail addresses and (b) receipt of invitees' responses. MAIM utility 250 may also be independent of e-mail engine 246 and calendaring function 248 and embeds certain function calls into code of calendaring function 248 to enable the features of the invention. According to the described embodiments of the invention, calendaring function 248 is linked via MAIM utility 250 with IM client 244 to enable direct IM chats with invitees to a meeting event generated by calendaring function 248, as described below.

According to the illustrative embodiment, OS 242, IM client 244, and enhanced e-mail engine 246 (with calendaring function 248 and MAIM utility 250) are located within memory 230 and executed by processor 205. In implementation, when processor 205 executes calendaring function 248 and MAIM utility 250, MAIM utility 250 enables calendaring function 248 of computer system 120 to complete (with some user input) a series of functional processes, including: (1) retrieving known (or locally stored) IM IDs for invitees to a calendared meeting; (2) retrieving new IM IDs from responses received to the meeting requests; (3) linking the IM IDs with each invitee; (4) determining a current IM status of each invitee and displaying the current status along with an invitee name/identification within MISD; (5) enabling a facilitator to join one or more of the invitees in an IM chat session by selecting specific invitees/attendees within the status display based on the invitee's current IM status; (6) establishing video conferencing capability with invitees whose IM client support such capabilities; and other features/functionality described below and illustrated by FIGS. 2-6.

Figure 2B:
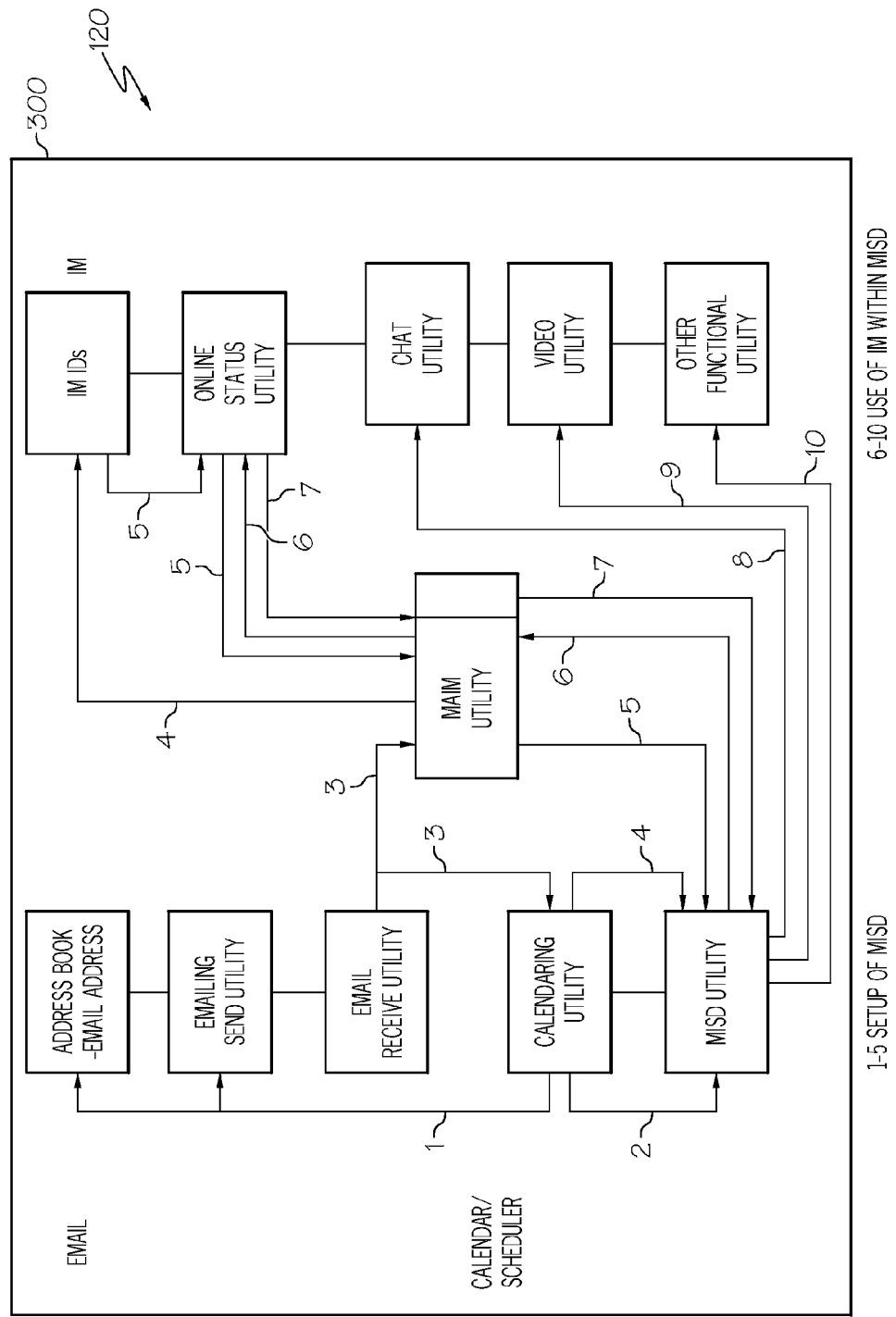
FIG. 2B is a block diagram representation of the various functional processes that make up the applications operating with the MAIM utility, in accordance with one embodiment of the invention.

Referring now to FIG. 2B, there is illustrated, in greater detail, an embodiment of the functional blocks of code that together enable the various processor-executable functions described for each of the software-enabled applications utilized herein. As shown in FIG. 2B, e-mail engine 246 comprises the following function blocks described as logic or utility: address book, e-mailing sending utility (or logic), e-mail receiving utility, calendaring utility and MISD utility. IM client 244 comprises the following functional blocks: IM IDs (contact list), online presence/status logic, chat utility (transmit/receive logic), video utility, and other functional utility/logic. IM IDs provide a list of IM contacts stored by facilitator within IM client 244.

Central to the invention and illustrated within FIG. 2B is MAIM utility/logic 250, which enables most or all of the novel features provided herein. In one embodiment, MAN utility embeds specific functions in the calendaring utility and MISD utility and thus enables calendaring utility and MISD utility to provide the functional features of the invention. However, NISD utility 250 may be provided as an off-the-shelf or downloaded software update that enhances an already existing calendaring utility. For simplicity in describing how the various functional blocks operate with each other, a series of connecting arrows are provided numbered 1-10, illustrating the sequence of operations that may be undertaken during implementation of one embodiment of the invention. Numbered arrows 1-5 indicate the flow of operations that enable set up of the meeting and generation of the MISD. Numbered arrows 6-10 then indicate the flow of operations that enable the facilitator to establish a chat session with invitees and/or activate a video chat or other function. A brief description of how these operations are completed via respective utilities follows. Leading numbers correspond to the process arrows illustrated within FIG. 2B.

(1) Calendaring utility generates a meeting notice addressed to invitee e-mail addresses from address book (or other source). E-mail sending utility transmits the meeting notice to the respective e-mail addresses over the connected computer network. (2) Calendaring utility updates MISD utility which generates an MISD with the list of invitees' identification (ID). (3) E-mail receiving utility receives the response messages and forwards the responses to calendaring utility and to MAIM utility. (4) Calendaring utility forwards the RSVP status (Yes/No) to update MISD utility. (4), (5) MAIM utility retrieves the IM IDs of the invitees ID, obtains the online status of the particular IM ID from the online status utility, and forwards the IM ID with online status to MISD utility.

(6) When MISD is accessed/opened, MISD utility triggers MAIM utility to request from online status utility the online status of each invitee ID within MISD. (7) MAIM utility returns the current online status to MISD utility. (8) (9) (10) MISD utility is then utilized to initiate a chat, video session or other function via chat utility, video utility or other function utility, respectively. While specific utilities are illustrated operating in particular sequence(s), the invention may be completed with a different configuration of utilities executing in a different sequence. Thus, the embodiment illustrated by FIG. 2B and describe above is intended solely for illustration and not intended to imply any limitations on the scope of the invention.

IM transmit/receive logic of chat utility is utilized to compose and receive IM messages once the facilitator activates/opens IM client 244 (directly from MISD). Set up of the IM client may include linking the client to the specific MISD so that the facilitator is automatically logged into the IM client when the facilitator opens a chat session from within MISD. When the intended recipient(s) is/are logged in at their devices (e.g., workstation, cellular telephone, PDA, etc.), the composed IM message is delivered to the recipient(s) in near real-time.

In one embodiment, the calendaring function may be further enhanced to provide the invitees an option of selecting the "chat available" response. The calendaring software may be stand-alone software or may be associated with an e-mail engine, such as Lotus Notes® or Microsoft Outlook®. The IM engine may be Sametime® (associated with Lotus Notes®) or Windows Live Messenger® (associated with MSN and Hotmail family of e-mail engines), or any other publicly or commercially available IM software.

Figure 3A:
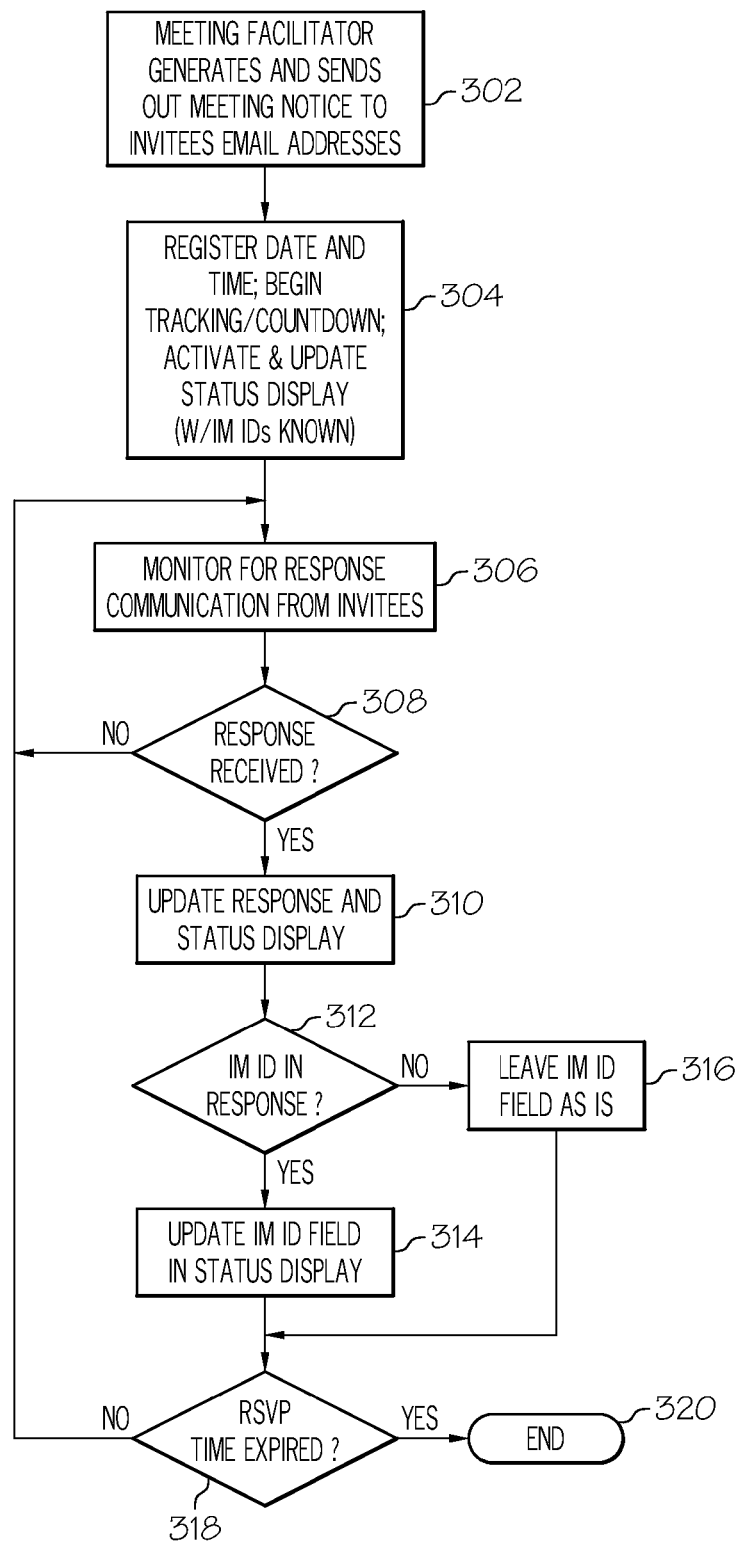
FIGS. 3A and 3B are flowcharts of the processes provided by the enhanced calendaring functions and the MAIM functions provided within embodiments of the present invention.

FIG. 3A illustrates the process steps completed by executing enhanced calendaring function with the MAIM utility, according to one embodiment. The MAIM utility is provided and embeds and/or associates Instant Messaging (IM) functionality in calendaring software. The process begins at block 302, at which meeting facilitator sends out a meeting request to a plurality of invitees using the calendaring function. The meeting may be a telephone conference, which is conducted via a different communication medium than the electronic medium in which the meeting request is transmitted. The time and place of the meeting is registered by the calendaring function and the time and date tracked by the calendaring function, as indicated at block 304.

The calendaring function then "monitors" for receipt of responses to the requests, as shown at block 306, and checks at block 308 whether a response is received. When no response is received, the calendaring function continues monitoring until all invitees have responded. When a response is received, the calendaring function then updates the MISD, as indicated at block 310. A determination is made, at block 312, whether the response contains an IM ID. When an IM ID is provided with the response, the MISD utility updates the IM ID field in the MISD (i.e., links the IM ID to the specific invitee name), as shown at block 314.

In one embodiment, return of an IM ID in the response occurs as follows. When the meeting request is generated, the request includes a prompt for an attendance response, which would indicate whether or not the invitee will attend the meeting. Several different attendance responses may be provided, including "Yes, I will attend", "No", and "Maybe" or "Undecided". Additionally, the invitee is prompted to provide an IM ID with the attendance response or an IM ID is retrieved as an attribute of the attendee's e-mail preferences. Thus, when the calendaring function receives the response from each invitee, at least an attendance response is provided. Additionally, the IM ID may also be provided if supplied by the invitee. Those invitees that do not provide a response are tagged as "not yet responded." These various responses received by calendaring function are forwarded to MISD utility to update the MISD.

Returning to FIG. 3A, if no IM ID is provided within the response, the current value in the IM ID field for that invitee is left the same, as shown at block 316. A determination is made, at block 318, whether the time to respond has expired (perhaps at the time the meeting is about to begin). If the time has expired, the process of updating the MISD ends at termination block 320. In one embodiment, calendaring function may only request an IM ID of those invitees for whom an IM ID is not listed within the facilitator's IM ID contact list. Also, all invitees who share a same IM service may automatically populate the field within which the IM ID is entered by the invitee. Alternatively, all invitees within a same LAN or network, sharing a similar e-mail engine and associated IM client, may exist within an extended contacts list on the network and retrievable by the MISD utility of the facilitator. In either case, MISD is updated with all intra-network IM IDs and may be updated with new (outside) IM IDs, where automatically provided or manually provided.

Figure 3B:
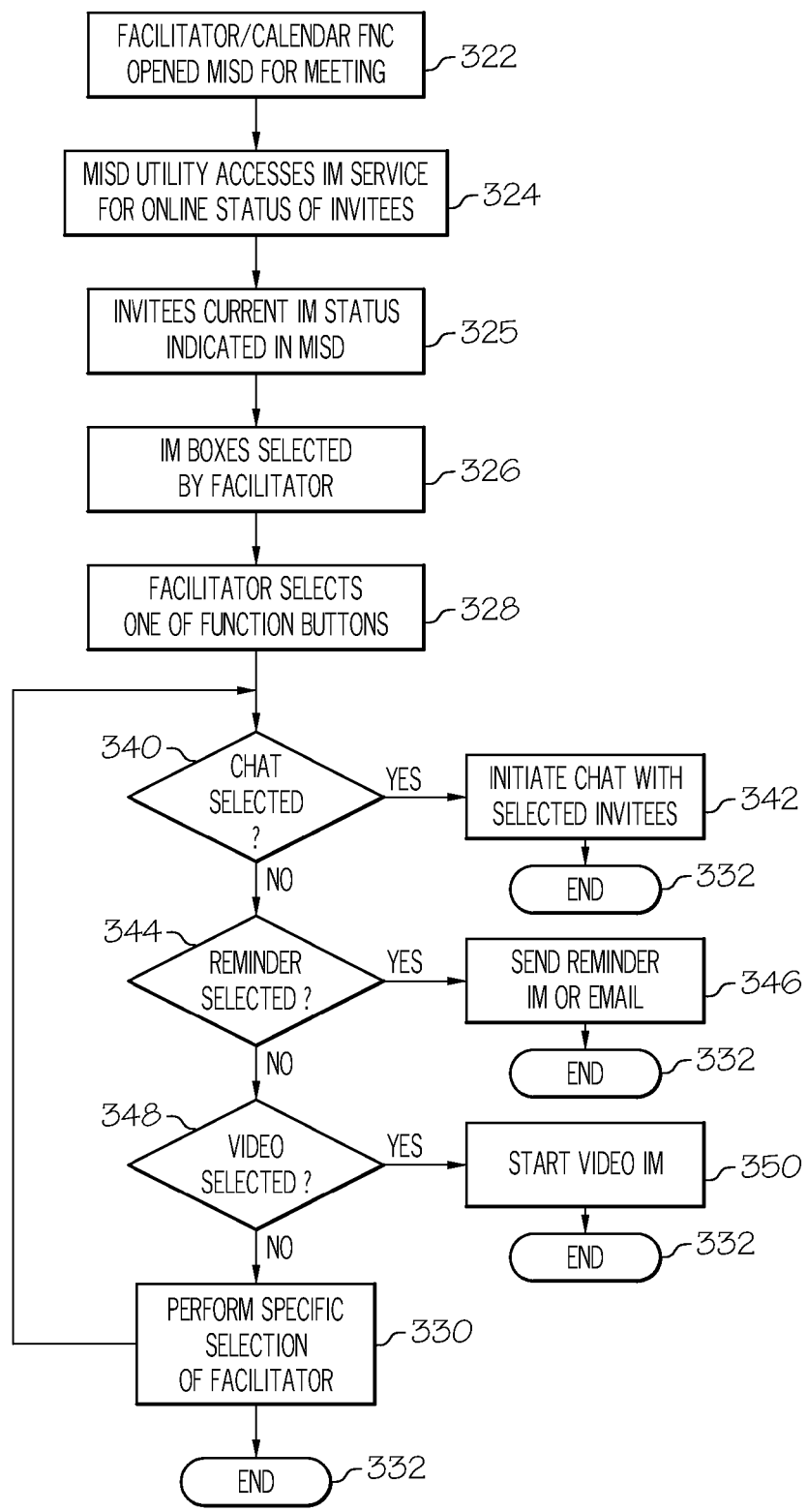

FIG. 3B is a flow chart illustrating the processing that occurs after MISD has been generated and updated with invitee responses. At some time prior to the meeting, the meeting facilitator opens MISD, as shown at block 322. On opening MISD for the meeting, the MISD utility immediately accesses relevant IM client and/or server to find a current IM status of each attendee (or each invitee), as shown at block 324.

IM presence logic of online status utility is configured to display the presence of all of the facilitator's IM contacts within the MISD. According to the invention, IM presence logic also displays the presence of any invitee who has an IM associated with their e-mail address/name within MISD. Online presence of the invitees (from different IM services) is determined using any one of a variety of known presence detection mechanisms that work across different IM services.

The method by which the invitee's current online status is determined is known in the art. However, when the invitee is present, but unavailable, then the invitee sets his online status to "unavailable," and the IM server 110b subsequently broadcasts the unavailability to the facilitator and other contacts who are present on the Internet. The invitee's status is displayed next to the name and/or IM ID of the invitee within the MISD.

Returning to FIG. 3B, once IM status is determined for each of the invitees whose IM ID is linked with their names, MISD then displays the attendees and their current IM status, as shown at block 325. Meeting requester receives a calendaring/meeting invitee status display (MISD) that indicates which invitees have accepted the request to the meeting (i.e., indicated by accepting the request ad posting a "Yes, I will attend" response to the request), and MISD displays the invitee status, and other pertinent information. An example MISD is provided by FIG. 4, which is now described.

FIG. 4 depicts a graphical user interface (GUI) representation of the example status display 400. As shown, status display 400 comprises a complete list of invitees 405 identified by invitee name and/or invitee e-mail address. Next to each invitee within list of invitees 405 is invitee meeting status 407 and current IM online status 410, indicating the IM online status of the particular invitee. Beside each current online status 410 is a check box 415, which is individually selectable by facilitator.

At the bottom of status display 400 are several selectable buttons, namely print button 421, chat button 423, close button 425, video conference button 427, reminder button 431 and user-definable button 433. With selectable buttons (420-440) at the bottom of status display 400, the facilitator is provided the option of electing (after checking one of invitee box 415) to complete one of several actions with respect to the selected invitees. Among these options, which are tied to their respective buttons, are: selecting chat button 425 to initiate an individual or group chat via IM client; selecting video conference button 427 to initiate an IM video conference; selecting reminder button 431 to initiate a pop up/e-mail reminder to invitees not yet at the meeting or on the conference call; initiating user programmed button 433 to activate an associated user programmed/defined function.

Thus, as provided by FIG. 4, the MISD utility provides an indication of a current IM status of each attendee to the meeting within the MISD, which status is displayed next to the attendee identifier (ID), in the illustrative embodiment. MISD utility extends the MISD with a display next to each invitee identifier (ID) of the current IM status of the invitee. This display enables the meeting owner/facilitator to see the current online IM status for all attendees.

Returning to FIG. 3b, the meeting owner/facilitator may optionally select specific attendees or all attendees and initiate a one-to-one or group IM chat with the selected attendees to begin a chat. Thus, at block 326, the facilitator selects one or more of the IM boxes next to specific ones (or all) of the invitees with "active" online statuses. Then the facilitator selects one of the function buttons at the bottom of MISD 400, as shown at block 328. Once the function button is selected, MISD utility performs the specific function selected with/on the invitees whose IM boxes were checked/selected, as depicted at block 330. Then the process ends at terminator block 332.

Notably, the specific function selected may be any one of the available functions. Thus insert to FIG. 3b illustrates selection of IM chat at block 340 resulting in activation of an IM chat session with the selected invitees, indicated at block 342. On receipt of the selection of chat button, MISD utility opens the IM client and initiates a group IM session with each of the selected invitee's IM IDs. Likewise, selection of IM reminder at block 344 results in sending an e-mail or IM reminder message, as indicated at block 346. Finally, selection of IM video at block 348 results in activation of an IM video session with the selected invitees whose IM client supports video IM, as indicated at block 350. Each selection then terminates the process at termination block 332. However, in implementation, any number of selections may be made for different sets of invitees, and each of the selections, which are completed in sequence, provides a different functionality (chat, video, reminder, etc) for a different set of invitees/attendees.

In one embodiment, the requestor may elect to simply send an IM reminder of the meeting, and thus selects the reminder button. When an invitee has not responded to the initial request, the requestor may ping the invitee via IM chat by selecting the invitee IM ID followed by reminder button. Alternatively, the requestor may program the option button as "send e-mail" and send an e-mail directly to the unresponsive invitee by selecting the user-preset send e-mail button. In yet another embodiment, the requestor may elect to initiate a video conference using the video conferencing capabilities of the IM client. With each selection, the invitee's IM client receives the content entered into the requestor's IM client and the invitee is able to receive this content and respond to the requester and other invitees that are joined in the IM session.

The group chat is initiated from within the MISD without requiring the meeting facilitator to have anything other than the e-mail address/name of the attendee. That is, the facilitator does not have to know the attendees' current IM IDs. Further, no new group is created before initiating the group chat and thus no new group has to be managed (members added and removed) by the facilitator. Finally, use of the features of the MAIM utility enables outside attendees to participate using other instant messaging clients and/or services. In one embodiment, the functions of MAIM utility are further extended to enable the addition of video or other collaborative techniques by section of a displayed, selectable icon or button on the MISD.

In the described embodiment, all invitees are provided a current online IM status, enabling the facilitator to selectively join other invitees to a group chat, where those invitees may have initially indicated that they would not attend the phone conference, but are available for a less intrusive online chat.

As described in detail above, the invention provides the ability to open an instant message session with participants (invitees or attendees) of a meeting based upon the status of the participants' respective responses to the requested attendance for the meeting. In one embodiment, all invitees are displayed within MISD with each invitee's current meeting status and their current IM status. The facilitator of the meeting views the current IM status for all invitees and optionally selects which invitees (e.g., only attendees or attendees not yet at the meeting) with whom to initiate an IM chat session, without having any knowledge of attendees' (invitees') IM IDs. Use of the MISD also enables outside attendees to participate utilizing other instant messaging services. Additionally, use of MISD enables the addition of video and/or other collaborative techniques at the push of a button.

It should be noted that while a human user has been described herein as the facilitator, other embodiments of the present invention are contemplated wherein other facilitator entities (e.g., software entities) are provided. The various functions carried out by the invention may be completed in an automated fashion, without human interaction or human presence. For example, the MISD may be utilized to indicate only the online (or current login) status of the IM account of the attendees and not the actual presence of the attendees. Thus, while the invention is described as providing the attendees' online status, implementation of the invention does not required that any attendee be physically present at his computer device in order for the online status to be displayed within the MISD. As another example, certain functions, such as initiating an IM session or a video conference may be dynamically performed by software, without requiring a human facilitator to initiate the session/conference.

Generally, the invention provides a method and system comprising a set of computer-generated processes including: generating an electronic notice of a meeting; transmitting the electronic notice to one or more electronic accounts, such as an electronic mail (e-mail) account, via corresponding electronic addresses; storing meeting particulars including an electronic account identifier (ID) of each of the one or more electronic accounts to which the electronic notice was transmitted; determining an instant messaging (IM) ID associated with each electronic account ID; and initiating an IM session using the electronic account ID, based on the link established with the IM ID. The invention further provides a computer program product with program code for completing the above set of processes.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media, when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention are performed by a service provider server, which may be any one of servers 110 (and described hereinafter as service provider server 110). Alternatively, the method described herein, and in particular as shown and described in FIGS. 3A-B, can be deployed as process software from service provider server 110 to client computer (synonymous with facilitator computer or computer system 120). Still more particularly, process software for the method so described may be deployed to service provider server 110 by another service provider server (not shown).

Figure 5A:
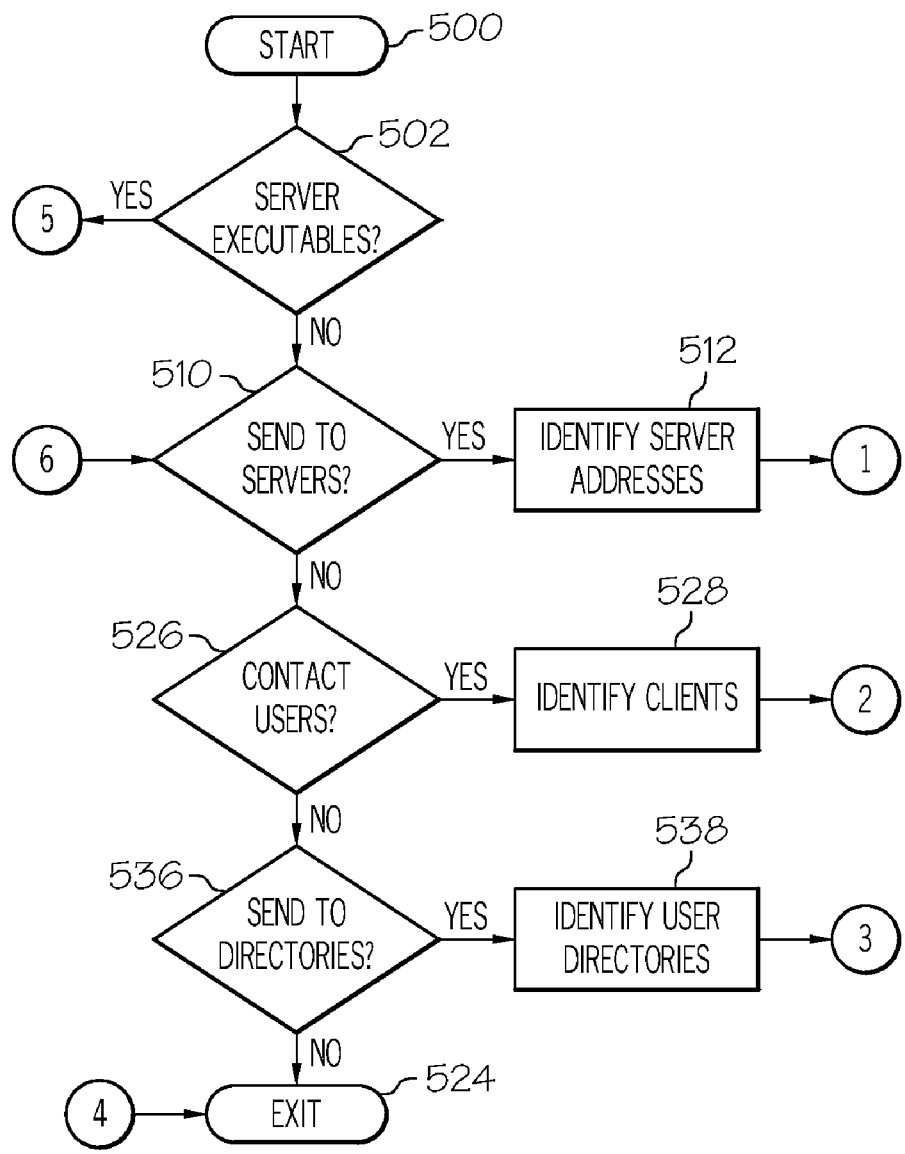
FIGS. 5A-B depict a flowchart of steps taken to deploy software capable of executing the steps shown and described in FIGS. 3A-B.
Figure 5B:
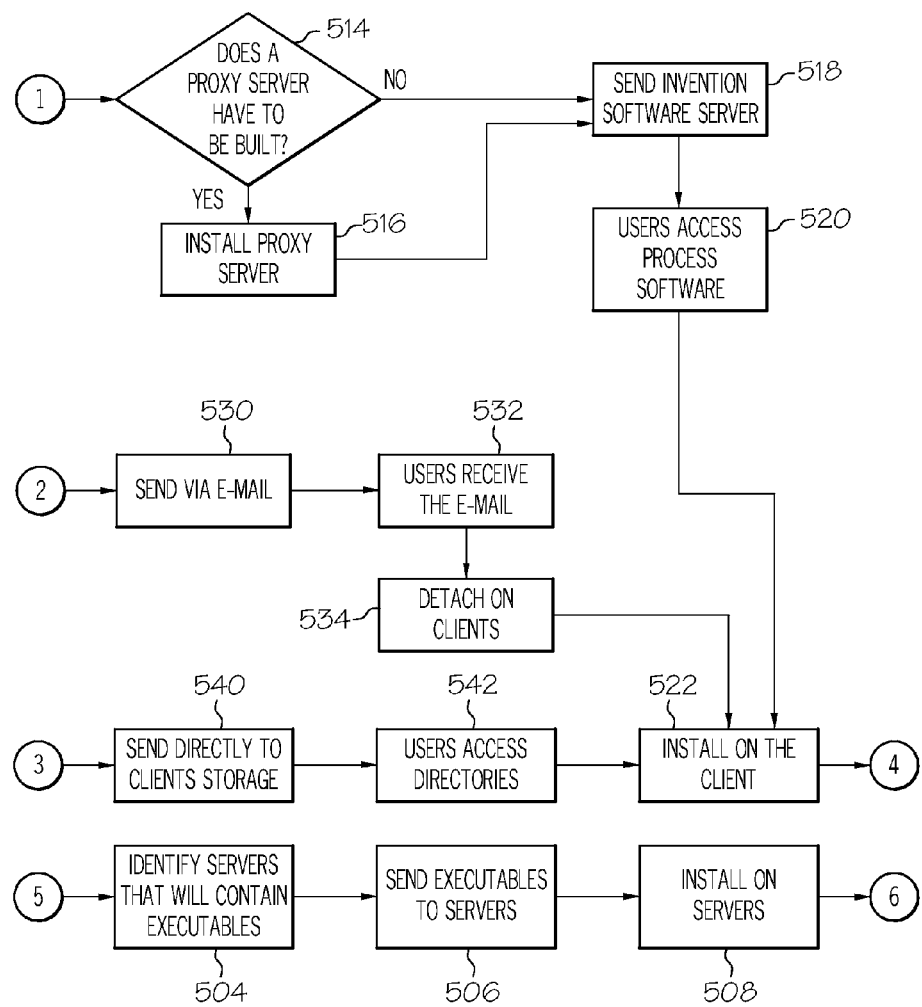

Referring then to FIGS. 5A-B, step 500 begins the deployment of the process software. The first step is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying through the use of a shared file system (block 506). The process software is then installed on the servers (block 508).

Next, a determination is made as to whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the requests to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment sends a transaction to the servers that contained the process software and has the server process the transaction, then receives and copies the process software to the server's file system. Once the process software is stored at the servers, the users, via their client computers, access the process software on the servers and copy the process software to their client computers' file systems (block 520). Another embodiment is to have the servers automatically copy the process software to each client and then run the installation program for the process software at each client computer. The user executes the program that installs the process software on his client computer (block 522) and then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and detach the process software from the e-mail to a directory on their client computers (block 534). The user executes the program that installs the process software on his client computer (block 522) and then exits the process (terminator block 524).

Lastly, a determination is made as to whether the process software will be sent directly to user directories on their client computers (query block 536). If so, the user directories are identified (block 538). The process software is transferred directly to the user's client computer directory (block 540). This can be done in several ways such as but not limited to sharing the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e., the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs, the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommutes can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that is required by the process software or that works in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure that the parameter lists match the parameter lists required by the process software. Conversely, parameters passed by the software applications to the process software will be checked to ensure that the parameters match the parameters required by the software applications. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software where the process software is to be deployed is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents but one measurement of use. Other measurements of use include but are not limited to network bandwidth, memory utilization, storage utilization, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory utilization, storage utilization, etc., approach a capacity so as to affect performance, additional network bandwidth, memory utilization, storage, etc., are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
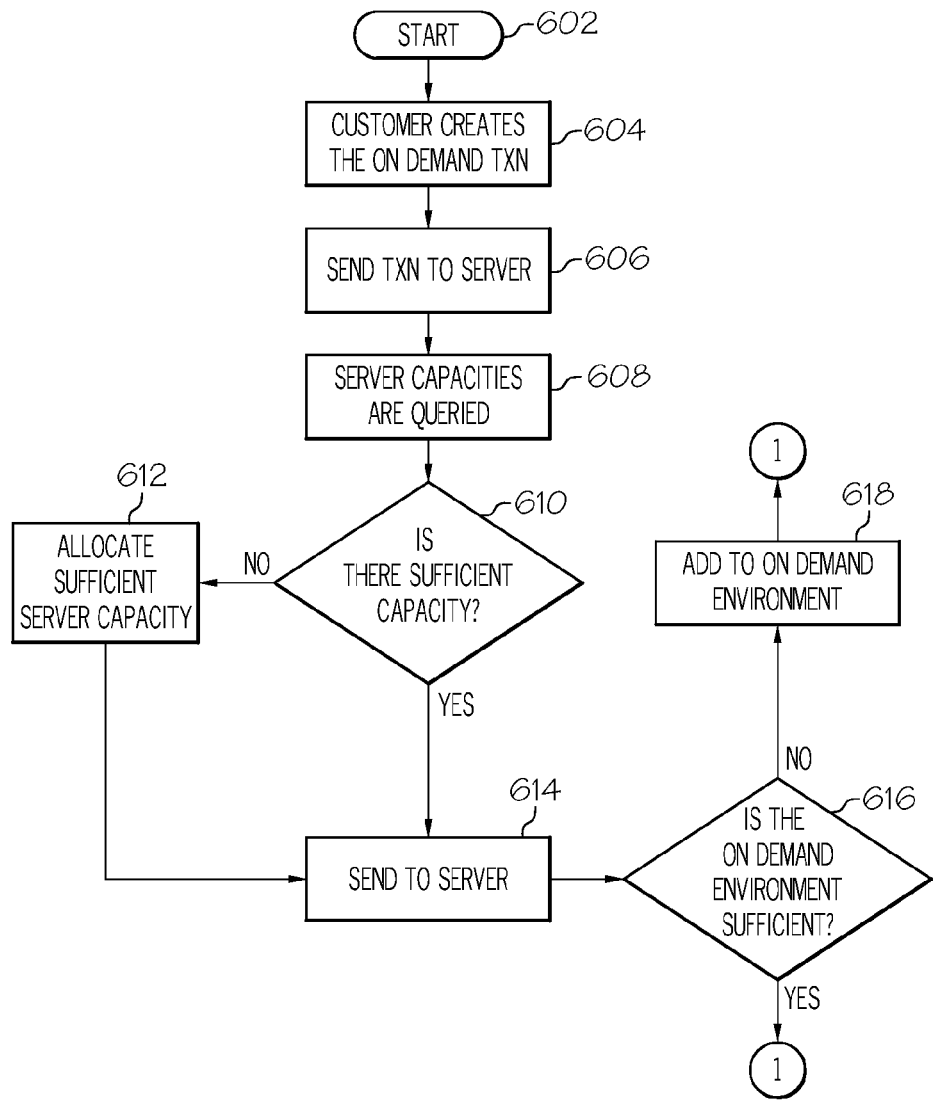
FIGS. 6A-B provide a flowchart depicting steps taken to execute the steps shown and described in FIGS. 3A-B using an on-demand service provider.
Figure 6B:
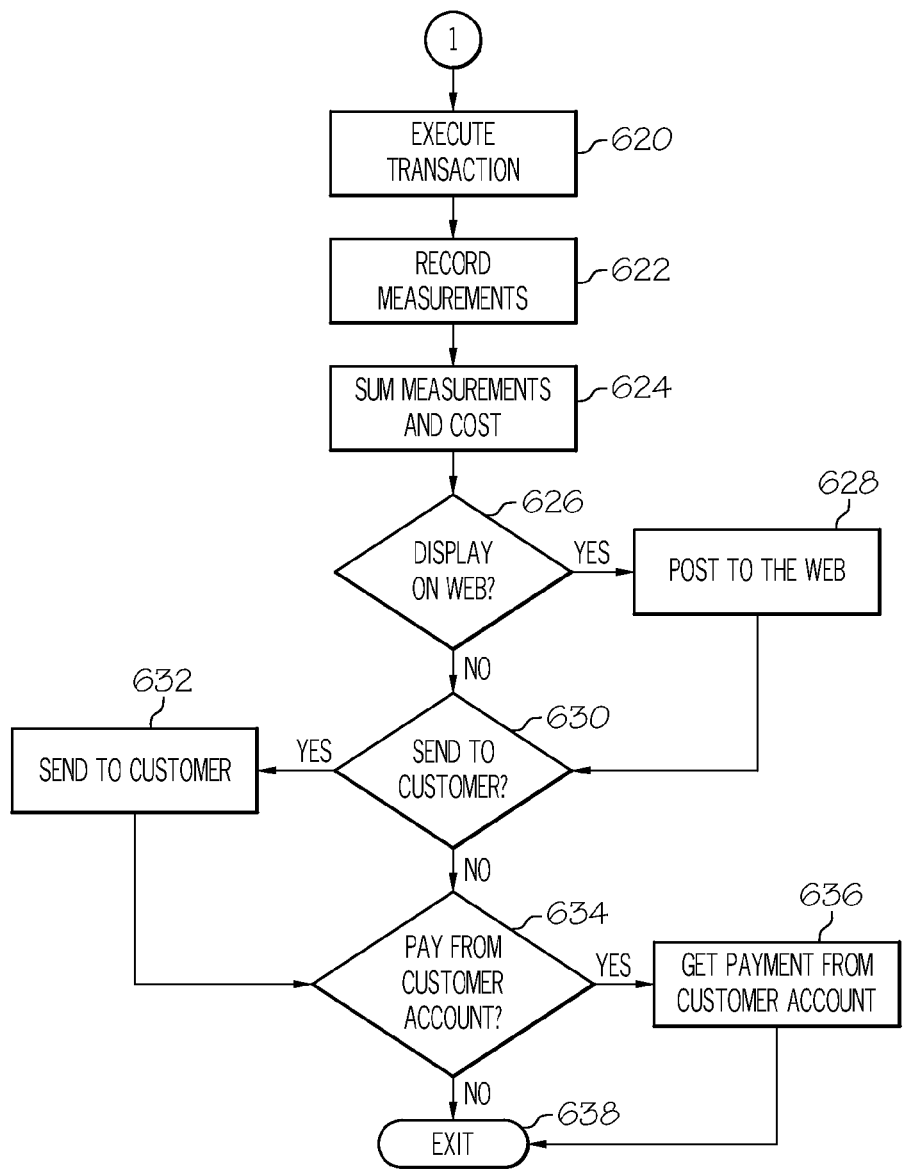

With reference now to FIGS. 6A-B, initiator block 602 begins the On Demand process. A transaction is created that contains the unique customer identification, the requested service type and any service parameters that further specify the type of service (block 604). The transaction is then sent to the main server (block 606). In an On Demand environment, the main server can initially be the only server, then, as capacity is consumed, other servers are added to the On Demand environment.

The server central processing unit (CPU) capacities in the On Demand environment are queried (block 608). The CPU requirement of the transaction is estimated, then the server's available CPU capacity in the On Demand environment is compared to the transaction CPU requirement to see if there is sufficient CPU capacity available in any server to process the transaction (query block 610). If there is not sufficient server CPU capacity available, then additional server CPU capacity is allocated to process the transaction (block 612). If there was already sufficient available CPU capacity, then the transaction is sent to a selected server (block 614).

Before executing the transaction, a check is made of the remaining On Demand environment to determine if the environment has sufficient available capacity for processing the transaction. This environment capacity consists of such things as, but not limited to, network bandwidth, processor memory, storage, etc. (block 616). If there is not sufficient available capacity, then capacity will be added to the On Demand environment (block 618). Next, the required software to process the transaction is accessed, loaded into memory, and the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method implemented on a computer and/or communication device comprising:
    a processor generating an electronic notice of a meeting within an electronic calendaring application;
    transmitting the electronic notice to one or more electronic accounts via corresponding electronic addresses from an electronic mail application to which the electronic calendaring application is linked, wherein the transmitting of the electronic notice occurs via electronic mail;
    storing meeting particulars including an electronic account identifier (ID) of each of the one or more electronic accounts to which the electronic notice was transmitted;
    linking a corresponding instant messaging (IM) ID with each electronic account ID, wherein the IM ID is retrieved from an IM service accessible on the computer and/or communication device or is received in a reply message to the electronic notice;
    generating a meeting invitee status display (MISD) that indicates (a) a listing of the one or more electronic account IDs; (b) a reply status of the one or more electronic account IDs to the electronic notice of the meeting; and (c) a current online status of each IM ID linked to the one or more electronic account IDs;
    when a reply message is received to the electronic notice, updating the MISD by linking the corresponding IM ID within an IM ID status field of the MISD that tracks an online status of the IM ID within the IM service, such that the online status is reflected within the calendaring application;
    providing within the MISD a selection mechanism to initiate a specific type of IM communication via the IM service;
    enabling initiation of an IM session from an interface of the electronic calendaring application using the electronic account ID, which is presented within the interface and is linked to the corresponding IM ID to enable the IM session over the IM service to be initiated via (a) a selection of the electronic account ID and (b) a request provided within the MISD on the calendaring application to trigger initiation of the IM session via the IM service; and
    enabling completion of one or more of several functions with one or more of the electronic account IDs, from among: printing a list of electronic account IDs notified of the meeting along with the reply status; activating an IM chat session; activating a video conference with electronic account IDs having corresponding IM IDs that are currently logged in; forwarding an automatic IM reminder of the meeting via the IM service; and completing a pre-programmed user function.

2. The method of claim 1, wherein:
said processor generating an electronic notice is completed via execution of a calendaring utility on the computer device; and
said initiating an IM session is completed via an IM client on the computer device.

3. The method of claim 2, wherein said initiating an IM session comprises:
automatically logging into the IM client;
opening an IM chat with the IM ID corresponding to the electronic account ID; and
when more than one electronic account IDs are associated with the initiating of the IM session, opening an IM group chat with the corresponding IM IDs linked to the more than one electronic account IDs.

4. The method of claim 1, wherein said generating an electronic notice comprises:
generating the electronic notice with a response function that returns a corresponding IM ID within a response message received from the electronic account, said response function including:
prompting for a reply message including a "chat available" response;
prompting for input of the IM ID in the response message; and
when an electronic account is configured with an e-mail preference set to provide an IM status with a display of the electronic account ID, tagging the chat available response with an IM attribute enabling linking of the associated IM ID to the electronic account;
wherein IM IDs that are not available via the computer and/or communication device for linking to the electronic account IDs are retrieved from the response message.

5. The method of claim 4, wherein said linking further comprises:
automatically linking the IM ID of each electronic account ID sharing a same IM service and electronic mail (e-mail) service with an e-mail utility from which the notice originated; and
when a reply message is received, and the reply message includes one or more of (a) the corresponding IM ID of the electronic account ID and (b) attributes indicating an online status of the corresponding IM ID, linking the online status of the corresponding IM ID to the electronic account ID.

6. The method of claim 1, further comprising:
detecting an opening of the MISD prior to the meeting;
automatically retrieving a current online status of each IM ID linked to the electronic account ID; and
displaying the current online status along with each electronic account ID whose online status is retrieved.

7. A communication device comprising:
a processor;
a memory coupled to the processor;
program code executing on the processor of the communication device, which provides the functions of:
generating an electronic notice of a meeting within an electronic calendaring application;
transmitting the electronic notice to one or more electronic accounts via corresponding electronic addresses from an electronic mail application to which the electronic calendaring application is linked, wherein the transmitting of the electronic notice occurs via electronic mail;
storing meeting particulars including an electronic account identifier (ID) of each of the one or more electronic accounts to which the electronic notice was transmitted;
linking a corresponding instant messaging (IM) ID with each electronic account ID, wherein the IM ID is retrieved from an IM service accessible on the computer and/or communication device or is received in a reply message to the electronic notice;
generating a meeting invitee status display (MISD) that indicates: (a) a listing of the one or more electronic account IDs; (b) a reply status of the one or more electronic account IDs to the electronic notice of the meeting; and (c) a current online status of each IM ID linked to the one or more electronic account IDs;
when a reply message is received to the electronic notice, updating the MISD by linking the corresponding IM ID within an IM ID status field of the MISD that tracks an online status of the IM ID within the IM service, such that the online status is reflected within the calendaring application;
providing within the MISD a selection mechanism to initiate a specific type of IM communication via the IM service;
enabling initiation of an IM session from an interface of the electronic calendaring application using the electronic account ID, which is presented within the interface and is linked to the corresponding IM ID to enable the IM session over the IM service to be initiated via (a) a selection of the electronic account ID and (b) a request provided within the MISD on the calendaring application to trigger initiation of the IM session via the IM service; and
enabling completion of one or more of several functions with one or more of the electronic account IDs, from among:
printing a list of electronic account IDs notified of the meeting along with the reply status; activating an IM chat session; activating a video conference with electronic account IDs having corresponding IM IDs that are currently logged in;
forwarding an automatic IM reminder of the meeting via the IM service; and
completing a pre-programmed user function.

8. The communication device of claim 7, wherein said program code for initiating an IM session comprises code for:
automatically logging into the IM client;
opening an IM chat with the IM ID corresponding to the electronic account ID; and
when more than one electronic account IDs are associated with the initiating of the IM session, opening an IM group chat with the corresponding IM IDs linked to the more than one electronic account IDs.

9. The communication device of claim 7, wherein:
said program code further comprises code for providing a calendaring utility enhanced with coded routines for functionally linking an IM status to the one or more electronic account ID and performing IM session initiation; and
said program code for generating an electronic notice comprises program code for generating the electronic notice with a response function that returns a corresponding IM ID within a response message received from the electronic account, said response function including:
  prompting for a reply message including a "chat available" response;
  prompting for input of the IM ID in the response message; and
  when an electronic account is configured with an e-mail preference set to provide an IM status with a display of the electronic account ID, tagging the chat available response with an IM attribute enabling linking of the associated IM ID to the electronic account;
  wherein IM IDs that are not available via the computer and/or communication device for linking to the electronic account IDs are retrieved from the response message.

10. The communication device of claim 9, further said program code for linking further comprising program code for:
  automatically linking the IM ID of each electronic account ID sharing a same IM service and e-mail service with an e-mail utility from which the notice originated; and
  when a reply message is received, and the reply message includes one or more of (a) the corresponding IM ID of the electronic account ID and (b) attributes indicating an online status of the corresponding IM ID, linking the online status of the corresponding IM ID to the electronic account ID.

11. The communication device of claim 7, further comprising program code for:
  opening the MISD prior to the meeting;
  automatically retrieving a current online status of each IM ID linked to the electronic account ID; and
  displaying the current online status along with each electronic account ID whose online status is retrieved.

12. A computer program product comprising:
  a computer-usable storage medium; and
  computer executable instructions on the computer-usable storage medium that when executed by a processor of a computer and/or a communication device provides the functions of:
    generating an electronic notice of a meeting;
    transmitting the electronic notice to one or more electronic accounts via corresponding electronic addresses from an electronic mail application to which the electronic calendaring application is linked, wherein the transmitting of the electronic notice occurs via electronic mail;
    storing meeting particulars including an electronic account identifier (ID) of each of the one or more electronic accounts to which the electronic notice was transmitted;
    linking a corresponding instant messaging (IM) ID with each electronic account ID, wherein the IM ID is retrieved from an IM service accessible on the computer and/or communication device or is received in a reply message to the electronic notice;
    generating a meeting invitee status display (MISD) that indicates (a) a listing of the one or more electronic account IDs; (b) a reply status of the one or more electronic account IDs to the electronic notice of the meeting; and (c) a current online status of each IM ID linked to the one or more electronic account IDs;
    when a reply message is received to the electronic notice, updating the MISD by linking the corresponding IM ID within an IM ID status field of the MISD that tracks an online status of the IM ID within the IM service, such that the online status is reflected within the calendaring application;
    detecting an opening of the MISD prior to the meeting;
    automatically retrieving a current online status of each IM ID linked to the electronic account ID;
    displaying the current online status along with each electronic account ID whose online status is retrieved;
    providing within the MISD a selection mechanism to initiate a specific type of IM communication via the IM service;
    enabling initiation of an IM session from an interface of the electronic calendaring application using the electronic account ID, which is presented within the interface and is linked to the corresponding IM ID to enable the IM session over the IM service to be initiated via (a) a selection of the electronic account ID and (b) a request provided within the MISD on the calendaring application to trigger initiation of the IM session via the IM service; and
    enabling completion of one or more of several functions with one or more of the electronic account IDs, from among: (a) printing a list of electronic account IDs notified of the meeting along with the reply status; activating an IM chat session; activating a video conference with electronic account IDs having corresponding IM IDs that are currently logged in; forwarding an automatic IM reminder of the meeting via the IM service; and completing a pre-programmed user function.

13. The computer program product of claim 12, wherein said computer executable instructions for enabling an IM session comprises instructions for:
  automatically logging into the IM client;
  opening an IM chat with the IM ID corresponding to the electronic account ID; and
  when more than one electronic account IDs are associated with the initiating of the IM session, opening an IM group chat with the corresponding IM IDs linked to the more than one electronic account IDs.

14. The computer program product of claim 12, wherein:
  said generating an electronic notice is completed via a calendaring utility enhanced with coded routines for functionally linking an IM status to the one or more electronic account ID and performing IM session initiation; and
  said computer executable instructions farther comprising instructions for generating the electronic notice with a response function that returns a corresponding IM ID within a response message received from the electronic account, said response function including:
    prompting for a reply message including a "chat available" response;
    prompting for input of the IM ID in the response message; and
    when an electronic account is configured with an e-mail preference set to provide an IM status with a display of the electronic account ID, tagging the chat available response with an IM attribute enabling linking of the associated IM ID to the electronic account;
    wherein IM IDs that are not available via the computer and/or communication device for linking to the electronic account IDs are retrieved from the response message.

15. The computer program product of claim 14, said computer executable instructions for completing said linking further comprises instructions for:

automatically linking the IM ID of each electronic account ID sharing a same IM service and e-mail service with an e-mail utility from which the notice originated; and when a reply message is received, and the reply message includes one or more of (a) the corresponding IM ID of the electronic account ID and (b) attributes indicating an online status of the corresponding IM ID, linking the online status of the corresponding IM ID to the electronic account ID.

16. The computer program product of claim 12, wherein the computer executable instructions are deployable to a client computer from a server at a remote location.

17. The computer program product of claim 12, wherein the computer executable instructions are provided by a service provider to a customer on an on-demand basis.

* * * * *